US006581106B1

(12) United States Patent
Crescenzi et al.

(10) Patent No.: US 6,581,106 B1
(45) Date of Patent: Jun. 17, 2003

(54) FAST ADDRESS LOOKUP IN ROUTING TABLES

(76) Inventors: Pierluigi Crescenzi, Via R. Galluzzi 5, 50134 Firenze (IT); Leandro Dardini, Via della Gualchiera 10, 59100 Prato (IT); Roberto Grossi, Via Fratti 14, 56125 Pisa (IT); Marcel Mordechay Yung, 605 W. 112th St., Apt. 4H, New York, NY (US) 10025

( * ) Notice: Subject to any disclaimer, the term of this patent is extended or adjusted under 35 U.S.C. 154(b) by 0 days.

(21) Appl. No.: 09/482,423

(22) Filed: Jan. 13, 2000

(51) Int. Cl.⁷ .............................................. G06F 15/16

(52) U.S. Cl. ....................................... 709/242; 709/238

(58) Field of Search ...................... 370/395.31, 395.32, 370/349, 351, 389; 709/238, 239, 242, 200

(56) References Cited

U.S. PATENT DOCUMENTS

| 5,386,413 | A |   | 1/1995  | McAuley et al.              |
|-----------|---|---|---------|-----------------------------|
| 5,970,232 | A | * | 10/1999 | Passint et al. ...... 709/238 |
| 6,011,795 | A | * | 1/2000  | Varghese et al. ..... 370/392 |
| 6,192,051 | B1| * | 2/2001  | Lipman et al. ....... 370/389 |
| 6,266,706 | B1| * | 7/2001  | Brodnik et al. ...... 709/242 |
| 6,385,649 | B1| * | 5/2002  | Draves et al. ....... 709/224 |
| 6,434,144 | B1| * | 8/2002  | Romanov ............. 370/392 |

OTHER PUBLICATIONS

Deering, S., and Hinden, R. Internet protocol, version 6 (IPv6). RFC 1883 (http://www.merit.edu/internet/documents/rfc/rfc1883.txt) 1995.

Degermark, M., Brodnik, A., Carlsson, S., and Pink, S. Small forwarding tables for fast routing lookups. ACM Computer Communication Review 27,4 (Oct. 1997), 3–14.

Fuller, V., Li, T., Yu, J., and Varadhan, K. Classless inter-domain routing (CIDR) RFC 1519 (http://www.merit.edu/internet/documents/rfc/rfc1519.txt), 1993.

Lampson, B., Srinivasan, V., and Varghese, G. IP lookups using multi-way and multicolumn search. In ACM INFOCOM Conference (Apr. 1998).

Morrison, D. Patricia—Practical Algorithm to Retrieve Information Coded in Alfanumerie. Journal of ACM 15, 4 (Oct. 1968), 514–534.

(List continued on next page.)

*Primary Examiner*—Mark R. Powell
*Assistant Examiner*—Marc D. Thompson
(74) *Attorney, Agent, or Firm*—Schweitzer Cornman Gross & Bondell LLP

(57) ABSTRACT

The routing address lookup problem is one of the major bottlenecks in high performance routers and deals with forwarding of packets. In the Internet domain it is known as "IP address lookup problem." This invention provides a new and easy way to preprocess routing tables which gives efficient packet/message forwarding and is feasible in the time and the space it consumes. More precisely, the method for m-bit IP addresses gives a balanced trade-off between performing a binary search on T with $O(\log|T|)$ accesses, where $|T|$ is the number of entries in T, and executing a single access on a table of $2^m$ entries obtained by fully expanding T. While the prior art starts out from space-efficient data structures and aim at lowering the $O(\log|T|)$ access cost, the invention starts out from the expanded table with $2^m$ entries and aim at compressing it without an excessive increase in the number of accesses. The embodiment results in a lookup which takes exactly three memory accesses in tables which occupy $O(2^{m/2}+|T|^2)$ space in the worst case. Since the Internet is more structured real routing tables for IP with m=32 bits, should take even much smaller space. For most routers the cache is sufficient to include our tables whereas dedicated routers need only a few megabytes cache for large tables. The impact of fast lookup is increased network bandwidth.

36 Claims, 1 Drawing Sheet

The overall IP address lookup data structures

OTHER PUBLICATIONS

Newman, P., Minshall, G., Lyon, T., and Huston, L. IP switching and gigabit routers. IEEE Communications Magazine (Jan. 1997).

Nilsson, S., and Karlsson, G. Fast address look-up for internet routers. In Alex (Feb. 1998), Universita di Trento, pp. 9–18.

Pei, T.-B., and Zukowski, C. Putting routing tables into silicon. IEEE Network (Jan. 1992), 42–50.

Postel, J. Internet protocol. RFC 791, (http://www.merit.edu/internet/documents/rfc/rfc0791.txt) 1981.

Srinivasan, V. and Varghese, G. Fast address lookups using controlled prefix expansion. In ACM Sigmetrics Conference (Sep. 1998).

Waldvogel, M., Varghese, G., Turner, J. and Plattner, B. Scalable hight speed IP routing lookups. ACM Computer Communication Review 27, 4 (Oct. 1997), 25–36.

* cited by examiner

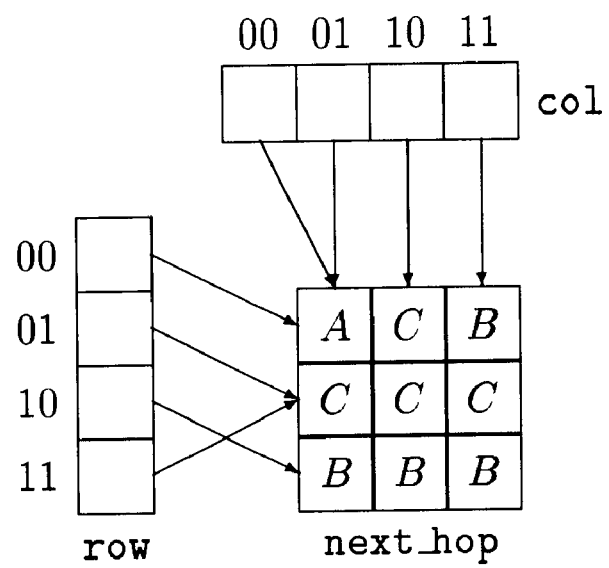
Figure 1: The overall IP address lookup data structures

FAST ADDRESS LOOKUP IN ROUTING TABLES

FIELD OF THE INVENTION

The invention relates to routing in networks, more particularly to a method and apparatus for facilitating fast routing at a network node. The routing (forwarding) stage it deals with is called "address lookup in routing (forwarding) tables." Given information designating which destination address has to be forwarded to which output port at a node, the stage organizes the information such that the on line search for this information (when a message/packet arrives at the node) is efficient in time and space consumed. The invention concerns with setting, performing and maintaining this stage. The invention is suitable (and is tuned to) the prevalent setting of Internet routing where addresses are called IP addresses. The invention is related to fast methods for solving the above problem within a standard processor architecture and with a small number of memory accesses. Due to fast routing, the invention is related to the issue of increased network bandwidth.

BACKGROUND OF THE INVENTION

Computer networks are expected to exhibit very high performance in delivering data because of the explosive growth of Internet nodes (from 100,000 hosts in 1989 to over 60 millions as of 1999). The network bandwidth, which measures the number of bits that can be transmitted in a certain period of time, is thus continuously improved by adding new links and/or by improving the performance of the existing ones.

Routers are at the heart of the networks in that they forward packets from input interfaces to output interfaces on the ground of the packets' destination Internet address, which we simply call IP address. They choose which output interface corresponds to a given packet by performing an IP address lookup at their routing table. As routers have to deal with an ever increasing number of links whose performance constantly improves, the address lookup is now becoming one of the major bottlenecks in high performance forwarding engines.

The IP address lookup problem was just considered a simple table lookup problem at the beginning of Internet. Now, it is unconceivable to store all existing IP addresses explicitly because, in this case, routing tables would contain millions of entries. In the early 1990s people realized that the amount of routing information would grow enormously, and introduced a simple use of prefixes to reduce space (see Fuller, V., Li, T., Yu, J., and Varadhan, K. "Classless inter-domain routing (CIDR): an address assignment and aggregation strategy" RFC 1519, 1993,). Specifically, IP protocols use hierarchical addressing, so that a network contains several subnets which in turn contain several host computers. Suppose that all subnets of the network with IP address 128.96.\*.\* have the same routing information apart from the subnet whose IP address is 128.96.34.\*. We can succinctly describe this situation by just two entries (128.96 and 128.96.34) instead of many entries for all possible IP addresses of the network. However, the use of prefixes introduces a new dimension in the IP address lookup problem: For each packet, more than one table entry can match the packet's IP address. In this case, the applied rule consists of choosing the longest prefix match, where each prefix is a binary string that has a variable length from 8 to 32 in IPv4 (see Postel, J. "Internet protocol", RFC 791, 1981,). For example, let us consider Table 1 where $\epsilon$ denotes the empty sequence corresponding to the default output interface, and assume that the IP address of the packet to be forwarded is 159.213.37.2, that is, 10011111 11010101 00100101 00000010 in binary. Then, the longest prefix match is obtained with the fourth entry of the table and the packet is forwarded to output interface D. Instead, a packet whose IP address is 159.213.65.15, that is, 10011111 11010101 01000001 00001111 is forwarded to output interface C.

Looking for the longest matching prefix in IP routing tables represents a challenging problem since lookups must be answered very quickly. In order to get a bandwidth of, say, 10 gigabits per second with an average packet length equal to 2,000, a router should forward 5 millions of packets per second. It means that each forwarding has to be performed in approximately 200 nanoseconds and, consequently, each lookup must be realized much faster.

DESCRIPTION OF RELATED ART

Several approaches have been proposed in the last few years in order to solve the IP address lookup problem. Hardware solutions, though very efficient, are expensive and some of them may become outdated quite quickly (See U.S. patent application Ser. No. 034,444, 1995 by McAuley, A., Tsuchiya, P., and Wilson, D. "Fast multilevel hierarchical routing table using content-addressable memory" as well as Newman, P., Minshall, G., Lyon, T., and Huston, L. "IP switching and gigabit routers" in IEEE Communications Magazine (January 1997)). Modern routers will use software or hardware and software combination. Next we will review the known software solutions.

A traditional implementation of routing tables (see Stevens, W., and Wright, C. "TCP/IP Illustrated, Volume 2 The Implementation" Addison-Wesley Publishing Company, Reading, Mass., 1995) use a version of Patricia tries, a very well-known data structure (Morrison, D. "PATRICIA—Practical Algorithm To Retrieve Information Coded In Alfanumeric" in Journal of ACM 15,4 (October 1968), 514–534). In this case, it is possible to show that, for tables with n elements, the average number of examined bits is 1.44 log n (log n is logarithm to the base 2 of the number n). Thus, for n=32000, this value is bigger than 21. When compared to millions of address lookup requests served in one second, 21 table accesses are too many. Another variation of Patricia tries has been proposed in order to examine k bit each time (in Pei, T.-B. and Zukowski, C. "Putting routing tables into silicon" in IEEE Network, 1992, pages 42–50). However, this variation deals with either the exact matching problem or with the longest prefix matching problem restricted to prefixes whose lengths are multiples of k.

A more recent approach (by Nilsson, S., and Karlsson, G. "Fast address look-up for internet routers" in ALEX (February 1998), Università di Trento, pp. 9–18) was inspired by the three-level data structure of Degermark, M. at al. ("Small forwarding tables for fast routing lookups", in ACM Computer Communication Review 27, 4 (October 1997), 3–14). which uses a scheme to compress multi-bit trie nodes using a bitmap, and is based on the compression of the routing tables by means of level compressed tries, which are a powerful and space efficient representation of binary tries. This approach seems to be very efficient from a memory size point of view but it requires many bit operations which, on the current technology, are time consuming.

Another approach is based on binary search on hash tables organized by prefix lengths (in Waldvogel, M. et al. "Scalable high speed IP routing lookups", in ACM Computer Communication Review 27, 4 (October 1997), 25–36). This technique is more memory consuming than the previous one but, according to the experimental evaluation presented by the authors, it seems to be very efficient from the time point of view.

A completely different way of using binary search is described in Lampson at al. (in "IP lookups using multi-way and multicolumn search" ACM INFOCOM Conference, (April 1998)). It is based on multi-way search on the number of possible prefixes rather than the number of possible prefix lengths and exploits the locality inherent in processor caches.

The most recent software solution to the IP address lookup problem is the one based on controlled prefix expansion (by Srinivasan, V., and Varghese, G. in "Fast address lookups using controlled prefix expansion" in ACM SIGMETRICS Conference (September 1998) and available full version to appear in ACM TOCS). This approach, together with optimization techniques such as dynamic programming, can be used to improve the speed of most IP lookup algorithms. When applied to trie search, it results into a range of algorithms whose performance can be tuned and that, according to the authors, provide faster search and faster insert/delete times than earlier lookup algorithms.

SUMMARY AND OBJECTIVES OF THE INVENTION

Any solution for m-bit IP addresses in a routing table T can be seen as a trade-off between performing a binary search on T with $O(\log|T|)$ accesses (where $|T|$ is the number of prefixes in T) and executing a single access on a table of $2^m$ entries obtained by fully expanding T. The above two methods are simple and available in the art. The results described in the prior art give space-efficient data structures and aim at lowering the $O(\log|T|)$ bound on the number of accesses which may be too slow for the increasing pace of messages sent via a typical router. The invention, instead, starts out from the fully expanded table with $2^m$ entries and aim at compressing it without an excessive increase in the (constant) number of accesses. For this reason, we call it an expansion/compression method.

We exploit the fact that the relation between the $2^{32}$ IP addresses and the very few output interfaces of a router is highly redundant for m=32. By expressing this relation by means of strings (thus expanding the original routing table), these strings can be compressed (using the run-length encoding scheme) in order to provide an implicit representation of the expanded routing table which is memory efficient. More important, this representation allows us to perform an address lookup in exactly three memory accesses and three clock cycles independently of the IP address. Intuitively, the first two accesses depend on the first and second half of the IP address, respectively, and provide an indirect access to a table whose elements specify the output interfaces corresponding to groups of IP addresses (see FIG. 1).

The invention gives a general paradigm which is a method for organizing a routing table for forwarding of network messages. It essentially works by associating each possible address with an address's first portion according to some sorting. Then the method employs compacting of this representation according to a first portion (prefix) into a first index set. Then it creates a unified compressed representation of a second portion of an address (suffix) and it uses this unified representation to designate at least another index set. Using the index sets the method creates a table indexed by the sets, where the table contains the output port/interface (next hop) entries corresponding to their respective addresses.

One of the strengths and novelties of the invention is that it completely avoids any special machinery for the longest prefix match described in the prior art. It transforms any IP prefix lookup into an indirect and standard access to a space-efficient array of memory locations. Consequently, its dominant cost is really given by the number of memory accesses with no hidden cost due to the processor architecture, such as branch prediction and other architectural features known to those skilled in the art.

The invention proposed here works for all routers belonging to the Internet and will be useful for a long period of time as the Internet grows. Moreover, its dominant cost is really given by the small number of memory accesses and it can be easily implemented in hardware where the hardware technology may vary and where tables can be written in hardware registers/tables.

We note that even though the theoretical upper bound on the worst-case memory size is $O(2^{m/2}+|T|^2)$, in fact theory is quite far from practice and that the characteristics of the routing tables will vary much slower than the rate at which cache memory size will increase. Also, sometimes only certain addresses are allowed to be routed within a sub-network. In this case the method can be adapted to deal with partial addresses and the expansion is limited.

The invention can be used to maintain routing tables in a fashion which is adaptive to the changing traffic pattern. In this sense the invention can also be viewed as a maintenance procedure.

It is the intent to combine the address finding disclosed in the invention with any routing or sub-routing mechanism that forwards information within networks or inside network elements (like routing stages in a complex switch). The methodology of actual forwarding/routing (after the forwarding goal is determined) can vary as well and can be based on combining time division or wave division multiplexing, using dedicated hardware and optics, and so on. The one familiar with the art is aware of the ways to combine quick addressing with various forwarding and routing routines. The description as an IP addressing is merely demonstrative and is not restrictive.

Based on the method disclosed, an apparatus can be devised (in hardware, software program or combination thereof) which is part of a router which is a computer performing the task of a network node. The node contains memory, cache memory and processing elements. The apparatus comprising means which are able to perform the various parts and stages as part of a router's function facilitating message forwarding and network routing.

It is the objective of this invention to achieve an adaptive mechanism to organize the IP lookup table (for message forwarding according to IP address).

It is further an objective of the invention to allow routing and forwarding mechanism that only looks at the IP address table a constant number of times (3 times). This results in a new mechanism for lookup, which is much faster and which implies increased speed of the routing mechanism and increased network bandwidth.

It is an objective of the invention to have a mechanism which is simple and runs on standard processors with no special computing power. To achieve the method's basic paradigms and operational stages new mechanisms are disclosed inhere.

DESCRIPTION OF THE DRAWING

FIG. 1 is a schematic representation of the overall IP address lookup data structures.

DETAILED DESCRIPTION OF THE INVENTION

We describe our embodiment of the invention solving the IP address lookup problem in terms of m-bit addresses.

The embodiment consists of two parts:
1. The preprocessing part, preparing the lookup tables.
2. The message/packet forwarding part, where given the destination, the tables are used to determine the output port/next hop of that message/packet.

The preprocessing part runs in two phases, expansion and compression.
1. In the expansion phase, we implicitly derive the output interfaces for all the $2^m$ possible addresses.
2. In the compression phase, we fix a value $1 \leq k \leq m$ and find two statistical parameters $\alpha_k$ and $\beta_k$ related to some combinatorial properties of the items in the routing table at hand. These two parameters characterize the space occupancy of the embodiment.

When our tables fit into an L2 cache, the method is extremely fast and a 1 megabyte such cache will suffice for most of backbone and enterprise routers. For dedicated routers, it is expected to have a few megabytes dedicated cache memory for the tables and dedicated hardware which can easily implement our tables and lookups.

Preliminaries and Notations

We need precise notation describing strings of bits, which are common in the literature. Given the binary alphabet $\Sigma = \{0, 1\}$, we denote the set of all binary strings of length k by $\Sigma_k$. We indicate the length of a string x by $|x|$. Given two strings $\alpha$ and $\beta$, we say that $\alpha$ is a prefix of $\beta$ (of length $|\alpha|$) if $|\alpha| \leq |\beta|$ and the first $|\alpha|$ bits of $\beta$ are equal to those in $\alpha$ (e.g., 101110 is a prefix of 1011101101110). Moreover, we denote by $\alpha \cdot \beta$ the concatenation of $\alpha$ and $\beta$, that is, the string whose first $|\alpha|$ bits are equal to $\alpha$ and whose last $|\beta|$ bits are equal to $\beta$ (e.g., the concatenation of 101110 and 1101110 is 1011101101110). Finally, given a string $\alpha$ and a string set S, we define $\alpha \cdot S = \{x | x = \alpha \cdot \beta \text{ with } \beta \in S\}$ as the concatenation of $\alpha$ and each string $\beta$ in S.

A routing table T relative to m-bit addresses is a sequence of pairs (p, h) where the route p is a string with $|p| \leq m$ and the next hop h is an integer in [1 ... H], with H denoting the number of next hops. In the following we will denote by $|T|$ the size of T, that is, the number of pairs in the sequence. Moreover, we will assume that T always contains the pair $(\epsilon, h_\epsilon)$ where $\epsilon$ denotes the empty string and $h_\epsilon$ corresponds to the default next hop.

The IP address lookup problem can now be stated as follows. Given a routing table T and $x \in \Sigma_m$, compute the next hop $h_x$ corresponding to address x. We have to uniquely identify a pair $(p_x, h_x)$ for which $p_x$ is the longest prefix of x appearing in T. That is, (a) $p_x$ is a prefix of x, and there exists $h_x$ such that $(p_x, h_x) \in T$;

(b) $|p_x| > |p|$ for any other pair $(p, h) \in T$, such that p is a prefix of x.

Conditions (a)–(b) are well defined since T contains the default pair $(\epsilon, h_\epsilon)$ and so $h_x$ always exists.

The Embodiment: Expansion Phase

We now describe the preprocessing part of the invention formally. The first step intuitively extends the routes of T that are shorter than m in all possible ways by preserving the information regarding their corresponding next-hop interfaces. We say that T is in decreasing (respectively, increasing) order if the routes in its pairs are lexicographically sorted in that order (lexicographic sorting is known in the art).

Computing Step 1

We take T in decreasing order and number its pairs according to their ranks, obtaining a sequence of pairs $T_1, T_2, \ldots, T_{|T|}$ such that $T_i$ precedes $T_j$ if and only if i<j. As a result, if $p_j$ is a prefix of $p_i$ then $T_i$ precedes $T_j$. We use this property to suitably expand the pairs.

Computing Step 2

With each pair $T_i = (p_i, h_i)$ we associate its expansion set, denoted $EXP(T_i)$, to collect all m-bit strings that have $p_i$ as a prefix. Formally, $EXP(T_i) = (p_i \cdot \Sigma_{m-|pi|}) \times \{h_i\}$, for $1 \leq i \leq |T|$. (Using portions other than the prefix is possible and understood to those skilled in the art).

Computing Step 3

We then define the expansion of T on m bits, denoted T', as the union $T' = \cup_{i=1}^{|T|} T'_i$ where the sets $T'_i$ are inductively defined and computed as follows: $T'_1 = EXP(T_1)$, and $T'_i = EXP(T_i) \ominus \cup_{1 \leq j < i} T'_j$, where the operator $\ominus$ removes from $EXP(T_i)$ all pairs whose routes already appear in the pairs of $\cup_{1 \leq j < i} T'_j$.

In this way, we fill the entries of the expanded table T' consistently with the pairs in the routing table T, as stated by the following fact.

Fact 1

If $(p_x, h_x) \in T$ is the result of the IP address lookup for any m-bit string x, then $(x, h_x) \in T'$.

Since we took all expansions T' is made up of $2^m$ pairs and that, if we had enough space, we could solve the IP address lookup problem with a single access to T'. We therefore need to compress T' somehow.

The Embodiment: Compression Phase

This phase heavily relies on a parameter k to be fixed later on, where $1 \leq k \leq m$. We are given the expanded table T' and wish to build three tables row, col and next_hop to represent the same information as T' in less space by a simple run length encoding (RLE) scheme (see Nelson, M., The Data Compression Book, M&T Books, San Mateo, Calif., 1992). We note that other encoding schemes may be possible and are within the scope of the current invention.

Computing Step 4

We begin by clustering the pairs in T' according to the first k bits of their strings. The cluster corresponding to a string $x \in \Sigma_k$ is $T'_{(x)} = \{(y, h_{xy}) | y \in \Sigma_{m-k} \text{ and } (x \cdot y, h_{xy}) \in T'\}$.

Note that $|T'_{(x)}| = 2^{m-k}$. We can define our first statistical parameter to denote the number of distinct clusters.

Definition 2

Given a routing table T with m-bit addresses, the row k-size of T for $1 \leq k \leq m$ is $$\alpha_k = |\{T'_{(x)} | x \in \Sigma_k\}|.$$

Parameter $\alpha_k$ is the first measure of a simple form of compression. Although we expand the prefixes shorter than k, we do not increase the number of distinct clusters as the following fact shows.

Fact 3

For a routing table T, let $r_k$ be the number of distinct next-hop interfaces in all the pairs with routes of length at most k, and let $n_k$ be the number of pairs whose routes are longer than k, where $1 \leq k \leq m$. We have $\alpha_k \leq r_k + n_k \leq |T|$.

Computing Step 5

We now describe the compression based upon the RLE scheme. It takes a cluster $T'_{(x)}$ and returns an RLE sequence $s_{(x)}$ in two logical steps:

1. Sort $T'_{(x)}$ in ascending order (so that the strings are lexicographically sorted) and number its pairs according to their ranks, obtaining $T'_{(x)} = \{(y_i, h_i)\}_{1 \leq i \leq 2^{m-k}}$.

2. Transform $T'_{(x)}$ into $s_{(x)}$ by replacing each maximal run $(y_i, h_i), (y_{i+1}, h_{i+1}), \ldots, (y_j, h_{i+l})$, such that $h_i = h_{i+1} = \ldots = h_{i+l}$, by a pair $<h_i, l+1>$, where $l+1$ is called the run length of $h_i$.

The previous steps encode the $2^{m-k}$ pairs of strings and interfaces of each cluster $T'_{(x)}$ into a single and (usually) shorter sequence $s_{(x)}$. Note that, by Definition 2, $\alpha_k$ is the number of distinct RLE sequences $s_{(x)}$ so produced.

Computing Step 6

We further process them to obtain an equal number of equivalent RLE sequences $s'_{(x)}$. The main goal of this step is to obtain sequences such that, for any i, the i-th pair of any two such sequences have the same run length value.

We show how to do it by means of an auxiliary function $\phi(s, t)$ defined on two nonempty RLE sequences $s=<a, f>\cdot s_1$ and $t=<b, g>\cdot t_1$ as follows:

$$\varphi(s,t) = \begin{cases} t & \text{if } s_1 = t_1 = \epsilon, \\ \langle b, f \rangle \cdot \varphi(s_1, t_1) & \text{if } f = g \text{ and } s_1, t_1 \neq \epsilon, \\ \langle b, f \rangle \cdot \varphi(s_1, \langle b, g-f \rangle \cdot t_1) & \text{if } f < g \text{ and } s_1, t_1 \neq \epsilon, \\ \langle b, g \rangle \cdot \varphi(\langle a, f-g \rangle \cdot s_1, t_1) & \text{if } f > g \text{ and } s_1, t_1 \neq \epsilon. \end{cases}$$

The purpose of $\phi$ is to "unify" the run lengths of two RLE sequences by splitting some pairs $<b, f>$ into $<b, f_1>, \ldots, <b, f_r>$, such that $f=f_1+ \ldots +f_r$. The unification defined by is $\phi$ a variant of standard merge, except that it is not commutative as it only returns the (split) pairs in the second RLE sequence.

In order to apply unification to a set of RLE sequences $s_1, s_2, \ldots, s_q$, we define function $\Phi(s_1, \ldots, s_q)$ that returns RLE sequences $s'_1, s'_2, \ldots, s'_q$ as follows. First, $$s'_q = \phi(\phi( \ldots \phi(\phi(\phi(s_1, s_2), s_3), s_4) \ldots, s_{q-1}), s_q).$$

As a result of this step, we obtain that the run lengths in $s'_q$ are those common to all the input sequences. Then, $s'_i = \phi(s'_q, s_i)$ for $i<q$: in this way, the pairs of the set of RLE sequences $s_1, s_2, \ldots, s_q$ are equally split.

This finishes the computation.

We are now ready to define the second statistical parameter. Given an RLE sequence s, let its length $|s|$ be the number of pairs in it. Regarding the routing table T, let us take the $\alpha_k$ RLE sequences $s_1, s_2, \ldots, s_{\alpha_k}$ obtained by the distinct clusters $T'_{(x)}$ with $x \in \Sigma_k$, and apply the unification $\Phi(s_1, s_2, \ldots, s_{\alpha_k})$ defined above.

Definition 4

Given a routing table T with m-bit addresses, the column k-size $\beta_k$ of T, for $1 \leq k \leq m$, is the (equal) length of the RLE sequences resulting from $\Phi(S_1, s_2, \ldots, s_{\alpha_k})$. That is, $$\beta_k = |s'_{\alpha_k}|.$$

Although we increase the length of the original RLE sequences, we have that $\beta_k$ is still linear in $|T|$.

Fact 5

For $1 \leq k \leq m$, $\beta_k \leq 2|T| - \alpha_k$.

Putting the Phases Together and the Packet Processing

The embodiment achieves a compact representation which is easy to search as we will show now. It stores a routing table T in a sufficiently compact way to guarantee always a constant number of accesses.

Here is a summary of the main computational steps for building T:

1. Find the $\alpha_k$ distinct clusters without their explicit construction.
2. Produce the RLE sequences corresponding to the distinct clusters.
3. Unify the RLE sequences by applying $\Phi$ and number the resulting sequences, all of length $\beta_k$, from 1 to $\alpha_k$.
4. Store the next hops of the r-th LRE sequence in row r of table next_hop, which hence has $\alpha_k$ rows and $\beta_k$ columns.
5. Set row[x[1 . . . k]]=r for each string x such that cluster $T'_{(x[1 \ldots k])}$ has been encoded by the r-th RLE sequence.
6. Let $f_1, \ldots, f_{\beta_k}$ be the run lengths in any LRE sequence, and let $sum(c) = \Sigma_{i=1}^{c} f_i$ denote the sum of the first c run lengths (where sum(0)=0). Set col[x[k+1 . . . m]]=c for each string x, such that x[k+1 . . . m] encodes an integer q with $sum(c-1) \leq q < sum(c)$.

The time complexity of the above procedure is bounded by $O(2^k + 2^{m-k} + |T|^2)$ because we use simple sorting, merging and scanning. We let #bytes(n) denote the number of bytes necessary to store an integer n, and a word be sufficiently large to contain the involved integers. We achieve the following:

Result 6

Given a routing table T with m-bit addresses and H next-hop interfaces, we can store T into three tables row, col and next_hop of total size $$2^k \cdot \text{\#bytes}(\alpha_k) + 2^{m-k} \cdot \text{\#bytes}(\beta_k) + \alpha_k \cdot \beta_k \cdot \text{\#bytes}(H)$$

in $O(2^k + 2^{m-k} + |T|^2)$ worst-case time, for $1 \leq k \leq m$, so that an IP address lookup for a string x of m bits takes exactly three accesses given by the following calculation per message/packet (which is three table accesses):

$$h_x = \text{next\_hop}[\text{row}[x[1 \ldots k]], \text{col}[x[k+1 \ldots m]]]$$

where x[ . . . j] denotes the substring of x starting from the i-th bit and ending at the j-th bit.

We wish to point out that the result represents a reasonable trade-off between performing a binary search on T with $O(\log|T|)$ accesses and executing a single access on a table of $2^m$ entries obtained by T.

Note that once the next hop is determined the router places the message on the output port corresponding to the next hop.

Implementing the method as a software program or as a hardware device combined with software program at a hosting computer are known to those who are skilled in the art. In fact, numerous implementations in software, hardware, firmware and combination thereof, are possible which represent applications of the principles and paradigms of the present invention. All variation on the treatment and processing of message destination addresses prior, during and after the lookup stage are possible and the embodiment is merely one example of address processing. Further, combining the invention with alternate routing mechanisms and devices can readily be devised by those who are skilled in the art without departing from the scope of the present invention.

A Demonstrative Example

Next we describe a small example of the application of our invention to a routing table. This illustrates the applicability of the suggested approach to a destination domain made out of binary strings and output interfaces (next hops) domain named by single letters. Its generalizations to other domains are apparent to those skilled in the art. As our example, let us consider the routing table T shown in Table 2 where m=4 and H=3.

The first step of the expansion phase consists of sorting T in decreasing order. The result of this step is shown in Table 3. This table is now expanded as shown in Table 4: the third column of this table shows the corresponding sub-tables $T'_i$ according to the definition of the expanded table $T'$.

Let us now enter the compression phase: to this aim, we choose k=2. We then have the following four clusters and the corresponding RLE sequences (shown between square brackets):

$$T'_{(00)}=\{(00,A),(01,A),(10,C),(11,B)\}\ [s_1=<A,2><C,1><B,1>]$$

$$T'_{(01)}=\{(00,C),(01,C),(10,C),(11,C)\}\ [s_2=<C,4>]$$

$$T'_{(10)}=\{(00,B),(01,B),(10,B),(11,B)\}\ [s_3=<B,4>]$$

$$T'_{(11)}=\{(00,C),(01,C),(10,C),(11,C)\}\ [s_4=s_2]$$

In this case $\alpha_k=3$ (since $T'_{(01)}=T'_{(11)}$, $r_k=3$ and $n_k=2$. We now unify the RLE sequences by applying function $\phi$. In particular, we have that $$s'_3=\phi(\phi(s_1,s_2),s_3)=\phi(<C,2><C,1><C,1>,s_3)=<B,2><B,1><B,1>$$

and $$s'_2=\phi(s'_3,s_2)=<C,2><C,1><C,1>$$

$$s'_1=\phi(s'_3,s_1)=<A,2><C,1><B,1>=s_1.$$

Clearly, $\beta_k=3$. Thus, #bytes($\alpha_k$)=#bytes($\beta_k$)=#bytes(H)=1 so that the memory occupancy is equal to 4+4+9=17 bytes (observe that the original table T occupies 6+6=12 bytes). In summary, the overall data structures is shown in FIG. 1.

Parameter Choice Tuning

We can observe the network traffic and investigate how the choice of the parameters above (say k) is affecting the actual performance based on destination statistics. This information can be used in recomputing the table adaptively.

Repeated Application of the Method

As the network changes, routing information changes since new network nodes are added or old one are eliminated. There are known method to collect the topology and determine routing information per destination. As the routing table information gets renewed, the methods here may be extended to work on-line. First, if the number of changes is small (one or two addition, for example), the IP lookup can first identify whether a package belongs to this set of newly added/deleted addresses and act accordingly: follow the new rule for the added nodes otherwise consult the prepared lookup tables. In case there are many changes, the above tables computed by the expansion compression phases has to be repeated.

It is possible that the method we disclose will be used only partially in a node and for certain destinations, a separate table or other data structure will be maintained, especially for frequent destinations whose next hop information can be made available, say to a parallel process. Such variations and combination of use are familiar to the skilled in the art and do not depart from the basic invention.

Preprocessing Packets

The destination addresses on packets and messages may be shifted, masked, encrypted or hashed. In each case a possible preprocessing of the address is needed to first move the packet into the representation according to which the routing tables were defined. The pre-processing may involve adjusting the destination tag, since some routing methods apply such swapping as part of the routing between different parts of the network.

REFERENCES

[1] USA PATENTS:
[2] McAuley, A., Tsuchiya, P., and Wilson, D. Fast multi-level hierarchical routing table using content-addressable memory. U.S. patent application Ser. No. 034,444, 1995.

[3] OTHER PUBLICATIONS:
[4] Deering, S., and Hinden, R. Internet protocol, version 6 (IPv6). RFC 1883, (http://www.merit.edu/internet/documents/rfc/rfc1883.txt) 1995.
[5] Degermark, M., Brodnik, A., Carlsson, S., and Pink, S. Small forwarding tables for fast routing lookups. *ACM Computer Communication Review* 27, 4 (October 1997), 3–14.
[6] Fuller, V., Li, T., Yu, J., and Varadhan, K. Classless inter-domain routing (CIDR): an address assignment and aggregation strategy. RFC 1519 (http://www.merit.edu/internet/documents/rfc/rfc1519.txt), 1993.
[7] Lampson, B., Srinivasan, V., and Varghese, G. IP lookups using multiway and multicolumn search. In *ACM INFOCOM Conference* (April 1998).
[8] Morrison, D. Patricia—Practical Algorithm To Retrieve Information Coded In Alfanumeric. *Journal of ACM* 15, 4 (October 1968), 514–534.
[9] Nelson, M. *The Data Compression Book*. M&T Books, San Mateo, Calif. 1992.
[10] Newman, P., Minshall, G., Lyon, T., and Huston, L. IP switching and gigabit routers. *IEEE Communications Magazine* (January 1997).
[11] Nilsson, S., and Karlsson, G. Fast address look-up for internet routers. In ALEX (February 1998), Università di Trento, pp. 9–18.
[12] Pei, T.-B., and Zukowski, C. Putting routing tables into silicon. *IEEE Network* (January 1992), 42–50.
[13] Postal, J. Internet protocol. RFC 791, (http://www.merit.edu/internet/documents/rfc/rfc0791.txt) 1981.
[14] Srinivasan, V., and Varghese, G. Fast address lookups using controlled prefix expansion. In *ACM SIGMETRICS Conference* (September 1998). Available full version to appear in ACM TOCS.
[15] Stevens, W., and Wright, G. TCP/IP *Illustrated, Volume 2 The Implementation*. Addison-Wesley Publishing Company, Reading, Mass., 1995.
[16] Waldvogel, M., Varghese, G., Turner, J., and Plattner, B. Scalable high speed IP routing lookups. *ACM Computer Communication Review* 27, 4 (October 1997), 25–36.

TABLE 1

An example of routing table

| Prefix | Output interface |
|---|---|
| ϵ | A |
| 10011111 | B |
| 10011111 11010101 | C |
| 10011111 11010101 00 | D |
| 10011111 11110 | E |

TABLE 2

An example of routing table T

| Route | Next-hop |
|---|---|
| ϵ | A |
| 10 | B |
| 001 | B |
| 01 | C |
| 0010 | C |
| 00 | A |

TABLE 3

The sorted routing table T

| Route | Next-hop |
|---|---|
| 10 | B |
| 01 | C |
| 0010 | C |
| 001 | B |
| 00 | A |
| $\epsilon$ | C |

TABLE 4

The expanded routing table T'

| Route | Next-hop | |
|---|---|---|
| 1000 | B | |
| 1001 | B | |
| 1010 | B | |
| 1011 | B | $T'_1$ |
| 0100 | C | |
| 0101 | C | |
| 0110 | C | |
| 0111 | C | $T'_2$ |
| 0010 | C | $T'_3$ |
| 0011 | B | $T'_4$ |
| 0000 | A | |
| 0001 | A | $T'_5$ |
| 1100 | C | |
| 1101 | C | |
| 1110 | C | |
| 1111 | C | $T'_6$ |

What we claim is:

1. A method for preparing a routing table for forwarding data packets based on addresses in a computational device inside a communication network, wherein said addresses are described by length $m$ bits and where actual strings are associated with actual addresses which are further associated with said computational device, comprising the steps of: (a) viewing the routing table as an implicit table which is fully expanded and has all possible $2^m$ entries where one starts with said actual strings and views their prefixes in increasing lengths, associating with each prefix all its possible extensions to $m$ bit strings, where a possible route may be associated with a prefix resulting in an intermediate table of said prefixes and associated possible suffixes; (b) compressing the intermediate table based on the condition that much less than all $m$ bit strings are said actual strings, using a data compression method resulting in an implicit representation; and (c) generating from said implicit representation an expanded table of table elements and auxiliary tables.

2. The method as in claim 1 wherein the data compression method is the run-length encoding scheme.

3. A method as in claim 1 wherein accessing an expanded table element requires three memory accesses, independent of address.

4. A method as in claim 1 wherein accessing an expanded table element requires three clock cycles, independent of address.

5. A method as in claim 1 wherein table elements are one of output ports, output interfaces, and next hop descriptions to which to forward and further route said packets.

6. A method as in claim 1 further including a preparatory step of collecting said actual strings based on association of addresses which are relevant to said computational device.

7. A method as in claim 1 further comprising an additional update stage in which is performed a new preparatory step of collecting one of potentially new actual strings and new parameters in said computational device, and where steps (a) (b) and (c) are further repeated, resulting in a new expanded table.

8. A method as in claim 1 wherein actual strings are restricted to allowed sets of addresses.

9. A method as in claim 1 wherein said addresses are IP addresses (addresses of the Internet Protocol).

10. A method as in claim 1 wherein the number of bits $m$ is 32.

11. A method as in claim 1 wherein said computational device is a network router comprising of at least one of hardware units, firmware modules, and software modules.

12. A method as in claim 1 wherein said computational device is at least one of Internet router, and network node.

13. A method as in claim 1 wherein said expanded table of table elements is to be addressed by two indexes, the first index corresponding to a first portion of an address presented at a given first representation and the second index corresponding to a second portion of an address presented at a given second representation.

14. A method as in claim 13 wherein the first portion is based on $k$ positions out of the $m$ bits and where the remaining $m-k$ bits constitutes the second portion.

15. The method as in claim 14 wherein $k$ is determined based on a first statistical parameter, depending on how well said data compression method performs in putting strings in clusters, and on a second statistical parameter, depending on the length of the compressed sequence when represented in splits of equal portions.

16. A method as in claim 14 wherein the first portion, based on $k$ positions out of the $m$ bits of an address, is translated for accessing said expanded table via an auxiliary row table and where further the remaining $m-k$ bits, comprising the second portion, are translated for accessing said expanded table via an auxiliary column table.

17. A method as in claim 1 with the additional step of getting a data packet at said computational device in an input interface and accessing said expanded table as part of logic associated with forwarding and routing said data packet to an output interface.

18. A method as in claim 1 wherein additional tables may be used for one of forwarding and routing.

19. A method as in claim 7 wherein said update stage includes preparing additional tables.

20. A method as in claim 1 with a further step comprising information of the network reaching the computational device inside a communication network, said information being used to determine the indexes and to retrieve an element from the expanded table, and further comprising forwarding and further routing of said information inside the network based on said retrieved element.

21. A method as in claim 20 wherein said information is carried in a packet.

22. A method as in claim 20 wherein said information is used to determine first and second portions to retrieve first and second indexes from auxiliary tables used to retrieve an element from the expanded table.

23. A method as in claim 22 wherein said element is one of output ports, output interfaces, and next hop description to which said information is further directed.

24. A method for forwarding packets in the network node where routing table exists which was prepared as in claim 1 comprising said packet reaching the node with address information where said address information is used to determine portions used to retrieve indexes from auxiliary tables, and where further indexes are used to retrieve an element from the expanded table, and where the method further comprises one of forwarding and routing of said packets inside the network based on network address associated with an element retrieved from said expanded table.

25. The method as in claim 24 wherein initially address information is preprocessed by at least one of shifting, masking, encrypting, data manipulation, adjusting and hashing.

26. The method as in claim 24 wherein some operations are performed by parallel processing.

27. A system for preparing a routing table for addresses in a computational device inside a communication network, wherein addresses are described by length $m$ bits and where actual strings are associated with said computational device, comprising: (a) a sub-system for computing on actual strings representing addresses and viewing their prefixes in increasing lengths, associating with each prefix all its possible extensions to $m$ bit strings where a possible route may be associated with a prefix, constructing an intermediate table representing length with actual prefixes and their associated suffixes; (b) a sub-system for compressing the intermediate table based on applying a data compression computer mechanism, resulting in the data represented in an implicit representation; (c) a sub-system for transforming such an implicit representation to an expanded table of table elements and auxiliary tables.

28. A system for using a routing table prepared as in the system of claim 27, comprising: (a) a sub-system for receiving data packets with addresses; (b) a sub-system for transforming the addresses into portions; (c) a sub-system for accessing auxiliary tables with portions retrieving indexes; (d) a sub-system for accessing expanded matrix with indexes retrieving an element; and (e) a sub-system for forwarding and routing packet to next hop in the network based on element retrieved.

29. A system for preparing a routing table for addresses in a computational device inside a communication network node comprising: (a) a sub-system for computing on actual addresses associated with the node, treating them as strings resulting in all prefixes of addresses and their potential extensions; (b) a sub-system for compressing the prefixes by applying a data compression computer mechanism, resulting in the data represented in an implicit representation; and (c) a sub-system for transforming an implicit representation to an expanded table of table elements and auxiliary tables, while balancing the index set of auxiliary tables.

30. A system for employing a routing table prepared by the system of claim 29, comprising a mechanism to accept packets into the network node; a mechanism to preprocess the address information in the packet; a mechanism for retrieving indexes from addresses in an existing routing table to retrieve an element; and using the element to process the packet.

31. A system for maintaining routing tables for addresses in a computational device inside a communication network node comprising: (a) a sub-system for repeatedly computing on actual addresses associated with the node, treating them as strings resulting in all prefixes of addresses and their current potential extensions; (b) a sub-system for compressing the prefixes by applying a data compression computer mechanism, resulting in the data represented in an implicit representation; (c) a sub-system for transforming an implicit representation to an expanded table of table elements and auxiliary tables, while balancing the index set of auxiliary tables and other tables; and (d) a sub-system determining the activation of adaptive maintenance.

32. The system of claim 28 wherein one of said sub-systems is at least one of a software logic, memory module, computer program, hardware component and firmware component.

33. The system of claim 29 wherein one of said sub-systems is at least one of a software logic, memory module, computer program, hardware component and firmware component.

34. The system of claim 30 wherein one of said sub-systems is at least one of a software logic, memory module, computer program, hardware component and firmware component.

35. The system of claim 31 wherein one of said sub-systems is at least one of a software logic, memory module, computer program, hardware component and firmware component.

36. The system of claim 27 wherein one of said sub-systems is at least one of a software logic, memory module, computer program, hardware component and firmware component.

* * * * *